United States Patent
Ehrenreich (12)

(10) Patent No.: US 7,146,919 B1
(45) Date of Patent: Dec. 12, 2006

(54) WAVE DIFFUSER APPARATUS AND METHOD

(75) Inventor: John R. Ehrenreich, Gulf Breeze, FL (US)

(73) Assignee: CoastLine Protection, Inc., Golf Breeze, FL (US)

( * ) Notice: Subject to any disclaimer, the term of this patent is extended or adjusted under 35 U.S.C. 154(b) by 0 days.

(21) Appl. No.: 11/101,839

(22) Filed: Apr. 8, 2005

(51) Int. Cl.
*B63B 1/34* (2006.01)

(52) U.S. Cl. .......................... 114/67 R; 405/22
(58) Field of Classification Search .............. 114/67 R; 405/21, 22, 25, 30, 32, 34
See application file for complete search history.

(56) References Cited

U.S. PATENT DOCUMENTS

| 1,622,568 | A | * | 3/1927 | Bignell | 405/32 |
| 1,646,168 | A | * | 10/1927 | Pringle | 405/32 |
| 1,844,484 | A | * | 2/1932 | Smith | 405/32 |
| 3,469,403 | A | * | 9/1969 | Jiro | 405/34 |
| 6,647,910 | B1 | * | 11/2003 | Royle | 114/67 R |
| 6,880,477 | B1 | * | 4/2005 | Royle | 114/67 R |

* cited by examiner

*Primary Examiner*—Lars A. Olson
(74) *Attorney, Agent, or Firm*—J. Nevin Shaffer, Jr.

(57) ABSTRACT

A wave diffuser apparatus and method includes, according to one embodiment, a receiver base and a wave disrupter conformed to attach to the receiver base. A load collar is attached to the wave disrupter and a load applicator is attached to the load collar.

16 Claims, 5 Drawing Sheets

WAVE DIFFUSER APPARATUS AND METHOD

FIELD OF THE INVENTION

While 2004 was notable for the number and ferocity of the storms that assaulted the United States, it was really no more than the same old story for those who live upon the coasts of the world. With the privilege of living close to water comes the responsibility of coping with storm driven waves. Many so called solutions may be found ranging from building a house on stilts, placing storm shutters on vulnerable areas of the house or changing the form or material components of the structure in radical ways.

The relentless pounding of storm driven waves has proven all these and all other prior art solutions to be of moderate usefulness at best. What is missing and what is needed is a simple apparatus and method that coastal livers can install themselves, that is easy to assemble and inexpensive and, most importantly, that effectively protects their homes and businesses from being battered to ruin by storm driven waves.

SUMMARY OF THE INVENTION

Accordingly, the wave diffuser apparatus and method of the present invention according to one embodiment includes a receiver base attached to a permanent support. A wave disrupter is attached to the receiver base.

According to another embodiment, the wave diffuser apparatus includes a receiver base. A wave disrupter conformed to attach to the receiver base is provided and a load collar is attached to the wave disrupter. A load applicator is attached to the load collar.

According to another aspect of the invention, the receiver base includes an extended lip. According to another aspect, the wave disrupter consists of a plurality of separate forms bound together and attached together to the receiver base. According to a further aspect, the plurality of separate forms are selected from a group consisting of: four, nine and sixteen separate forms.

According to another aspect, the load applicator is a cable. According to another aspect, load applicator includes a load adjuster. According to a further aspect, more than one load applicator is provided. According to another aspect, the load applicator includes a load applicator anchor.

In accordance with another embodiment of the invention, a wave diffuser apparatus includes a retention base and a wave disrupter conformed to attach to the retention base. A load rod is attached to the wave disrupter on one end and a load rod retention base is attached to the load rod at another end of the load rod.

In accordance with another aspect of this invention, the wave disrupter consists of an impact plate. According to another aspect, the impact plate is rotatably attached to the retention base.

In accordance with another embodiment of the invention, a wave diffuser apparatus includes a receiver base with a top and a bottom with an extended lip attached near the bottom. A wave disrupter conformed to attach to the receiver base is provided and a load collar is attached to the wave disrupter. A load applicator is attached to the load collar and a load adjuster is attached to the load applicator According to another aspect of this invention, the wave disrupter consists of a plurality of separate forms bound together and attached together to the receiver base. According to a further aspect, the plurality of separate forms are selected from a group consisting of: four, nine and sixteen separate forms. According to another aspect, the wave disrupter consists of an impact plate. According to another aspect, a brace is connected to the wave disrupter. According to a further aspect, the load applicator is a cable. According to a further aspect, the load applicator includes a load applicator anchor.

In accordance with an embodiment of the method of the invention, a method of protecting structures from damage from waves consists of the steps of preparing a receiver base and installing a plurality of the receiver bases between a structure and a wave source wherein each receiver base is spaced apart from another receiver base a distance of approximately a foot or more. Next, the user attaches a wave disrupter to each of the receiver bases. Next, the user attaches a load collar to each of the wave disrupters. Next, the user attaches a load applicator to each of the load collars. Next, the user attaches a load adjuster to each of said load applicators. and applies a load According to another aspect of this invention, the step of installing a plurality of receiver bases includes installing the plurality of receiver bases within the wave source.

DESCRIPTION OF THE DRAWINGS

Other features and advantages of the present invention will become more fully apparent from the following detailed description of the preferred embodiments, the appended claims and the accompanying drawings in which:

DETAILED DESCRIPTION OF THE INVENTION

Figure 1:
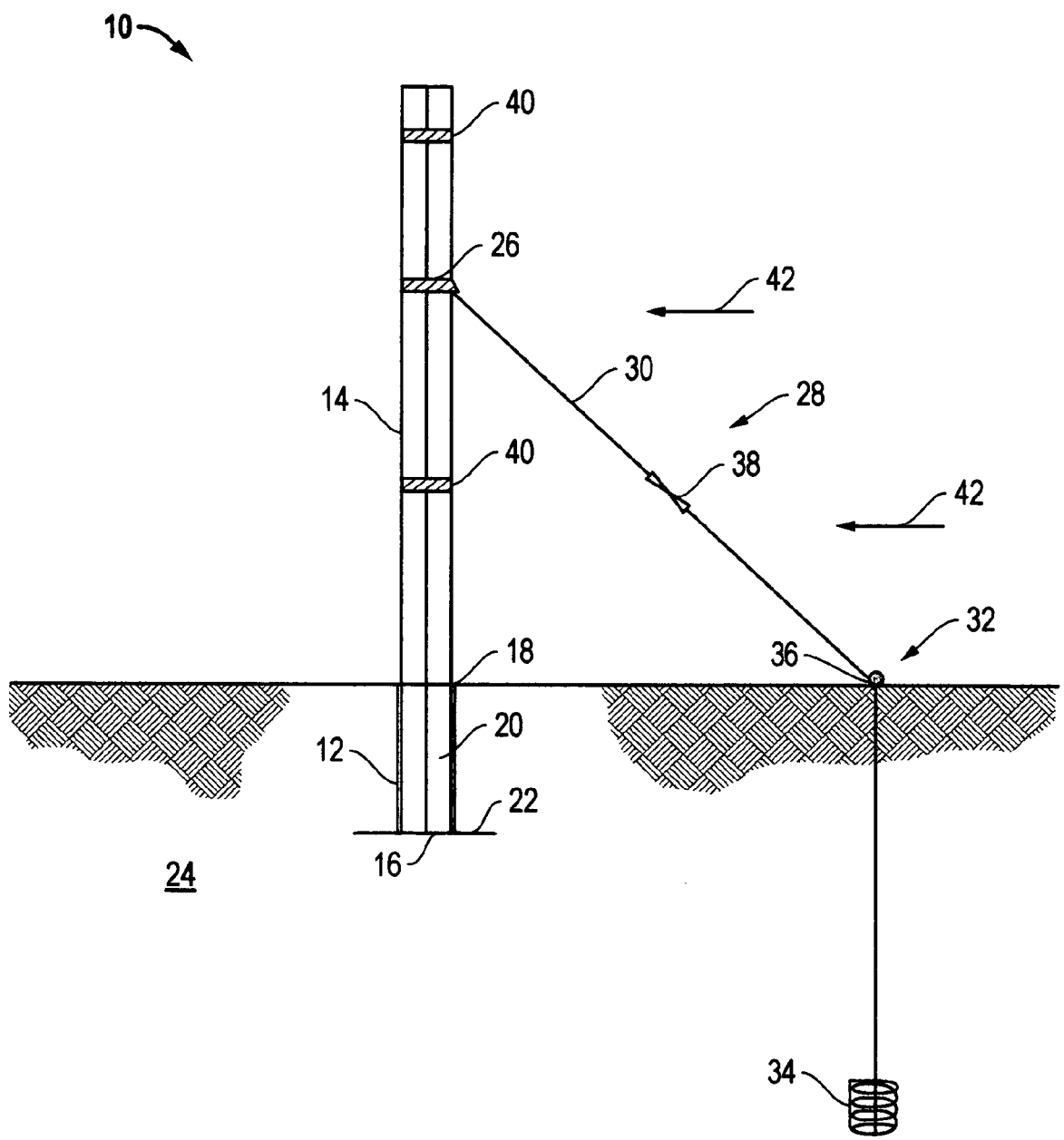
FIG. 1 is a side view of the wave diffuser apparatus according to an embodiment of the present invention.

The preferred embodiment of the present invention is illustrated by way of example in FIGS. 1–5. With specific reference to FIG. 1, the wave diffuser 10 of the present invention includes, according to one embodiment, a receiver base 12. Receiver base 12 is conformed to receive wave disrupter 14 and wave disrupter 14 is conformed to fit within and be received by receiver base 12.

By way of example only and not by limitation, receiver base 12 is formed of galvanized steel in an extended rectangular form approximately two feet long. The four sides of the receiver base 12 are connected to bottom 16 and form an opening at top 18 in the form of a square approximately eight inches on a side 20. Obviously, receiver base 12 may be made of any materials now known or hereafter developed and may be of any desired dimensions.

According to one aspect of the invention, receiver base 12 includes a lip 22. Once receiver base 12 is buried in the ground 24, lip 22 ensures that receiver base 12 does not move and prevents removal of the receiver base 12 from the ground 24. Lip 22 preferably extends from the sides 20 approximately six inches.

By way of example only, and not by limitation, wave disrupter 14 according to the embodiment disclosed in FIG. 1, is a long rectangular structure that, again, fits within receiver base 12 at one end of wave disrupter 14 and extends above the ground 24. For example only, according to a preferred embodiment, wave disrputer 14 is created by the combination of four 4" by 4" by ten foot treated boards. These dimensions are useful because they are common and the materials are inexpensive and easily obtained and handled by individuals. Obviously, any materials now known or hereafter developed may be used in accord with the invention and any useful dimensions may be selected.

Still referring to FIG. 1, a load collar 26 is shown attached to wave disrupter 14. According to one embodiment, load collar 26 is a metal collar formed to fit tightly around wave disrupter 14. Load collar 26 may obviously be made of any material desired or hereafter developed. A load applicator 28 is connected to load collar 26. According to one aspect of the invention, load applicator 28 consists of a metal cable 30 of, for example, galvanized braided steel. Cable 30 is connected to load collar 26 and to anchor 32 in ground 24. Anchor 32, according to one aspect of the invention, consists of a helical screw anchor with a helical screw 34 on one end and a cable attachment point 36 on the other end. While anchor 32 may be of any desired and useful dimension, the Applicant has determined that a six foot anchor with a helical screw 34 of ten inches in dimension is satisfactory for the purposes of the invention.

FIG. 1 also illustrates load adjuster 38. Load adjuster 38 is any adjustable load binder for adjusting the load applied to cable 30, for example. Also illustrated are binding straps 40. Binding straps 40 hold, when applicable as wherein wave disrupter 14 is composed of separate forms, wave disrupter 14 tightly together along its extended length and add rigidity and strength. Binding straps 40 may be made of any suitable material such as plastic, metal, nylon or the like.

Finally, FIG. 1 illustrates the preferred location of the various elements of wave difuser 10. That is, preferably, receiver base 12 is located in the dry ground 24 some distance away from the source of any waves. And the load applicator 28 is located between the wave disrupter 14 and the wave source coming as illustrated from the direction of direction arrow 42.

Figure 2:
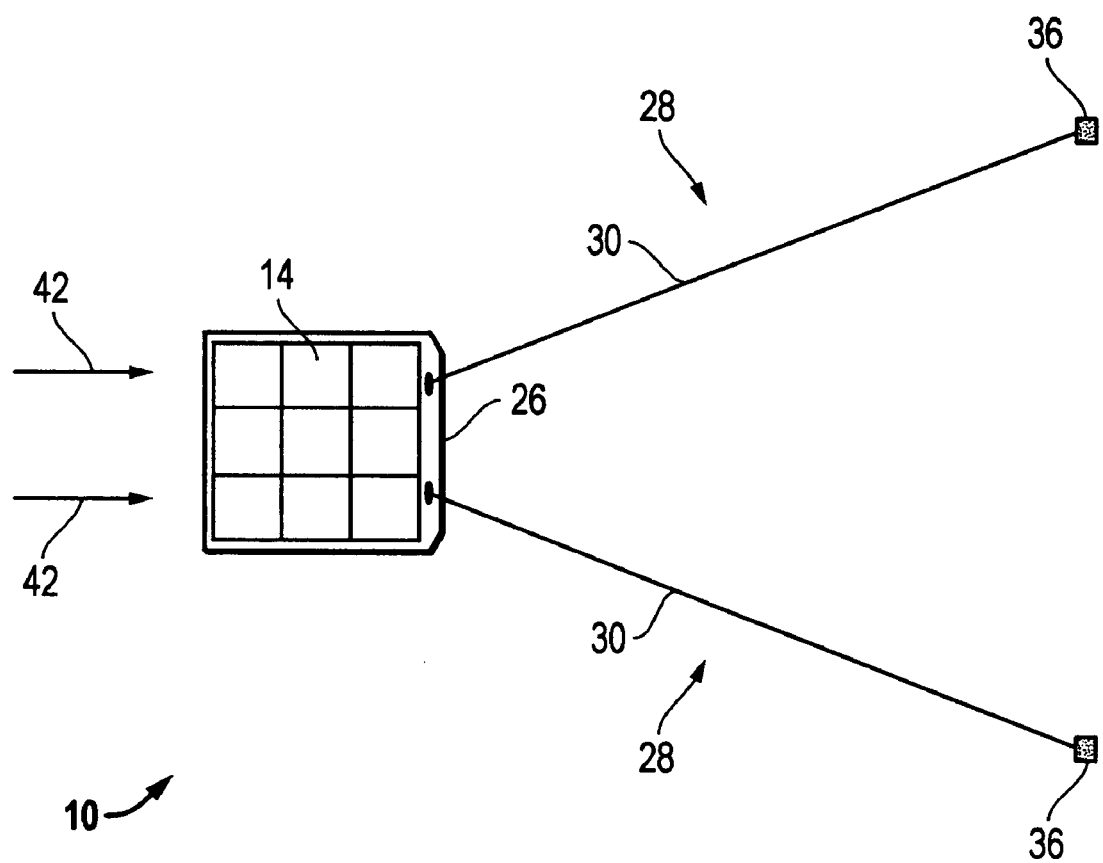
FIG. 2 is a top view of the invention according to FIG. 1.

Referring now to FIG. 2, other aspects of the invention are illustrated. Here, two load applicators 28 are attached to load collar 26. Also, wave disrupter 14 in this illustration is shown consisting of nine 4" by 4" wooden boards. Again, any number of these common boards may be selected as desired. Preferably the number chosen forms a square in combination such as four, nine or sixteen, for example only.

FIG. 2 also shows that load applicators 28 may be positioned such that waves coming from the direction of direction arrow 42 hit wave disrupter 14 first. Certainly, any number and location of load applicators 28 as deemed useful is appropriate for the purposes of the invention.

Figure 3:
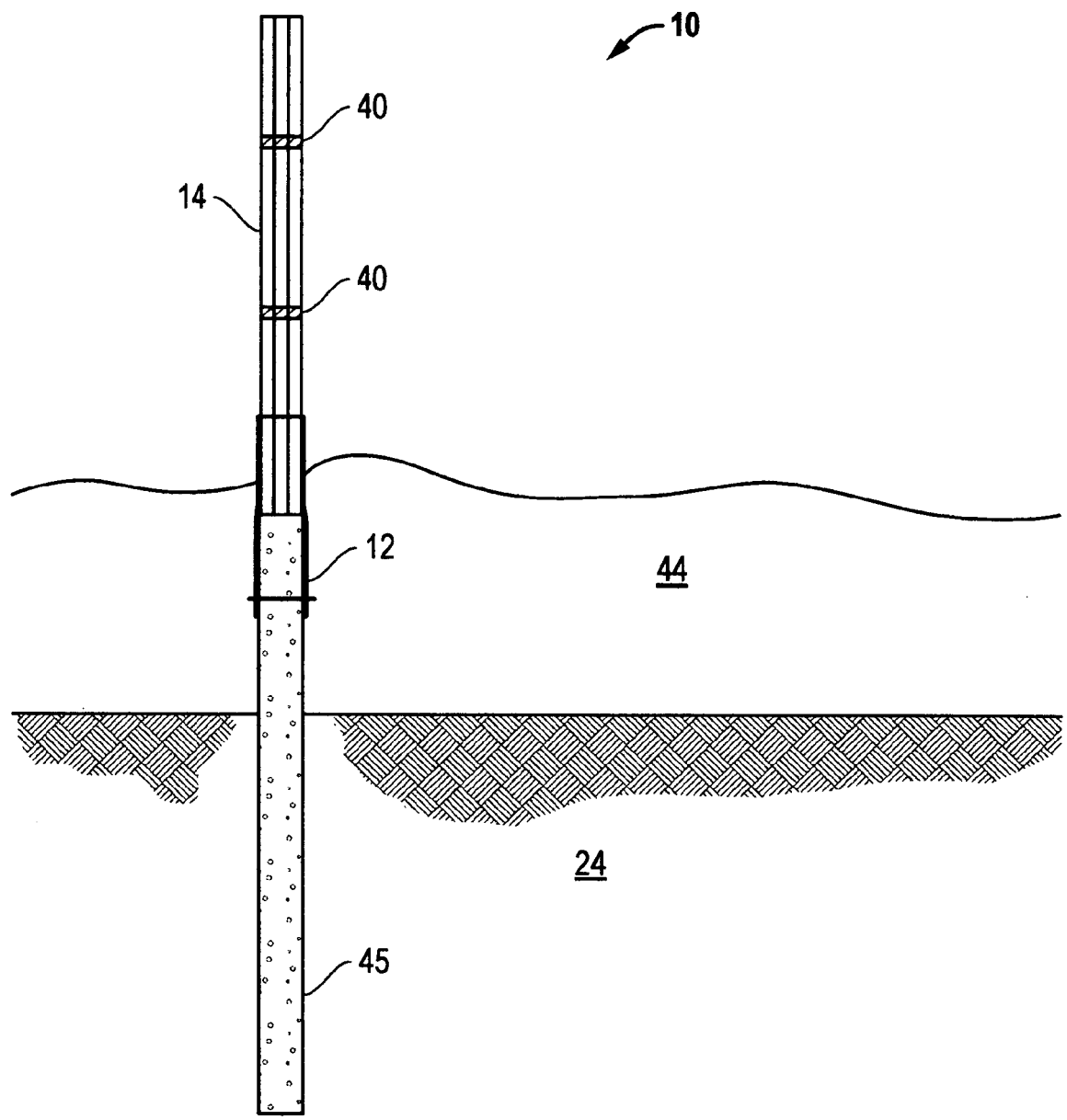
FIG. 3 is a side view according to another aspect of the invention wherein the wave diffuser is located in the water.

Referring now to FIG. 3, another aspect of the invention is illustrated wherein the receiver base 12 is located in water 44 and mounted on a permanently installed support 45. In this situation, the user has determined to place wave diffuser 10 in the water 44. This may be because the user's structure he desires to protect is very close to the water 44 and placing the wave diffuser 10 on land 24 would not allow the wave diffuser 10 to function properly as discussed more fully hereafter with regard to FIG. 5. In any event the basic structure of wave diffuser 10 is the same whether in water 44 or land 24. In some cases, due to the location in the water or the particular geography, the load applicator 28 is left off and the wave diffuser 10 is free standing.

Figure 4:
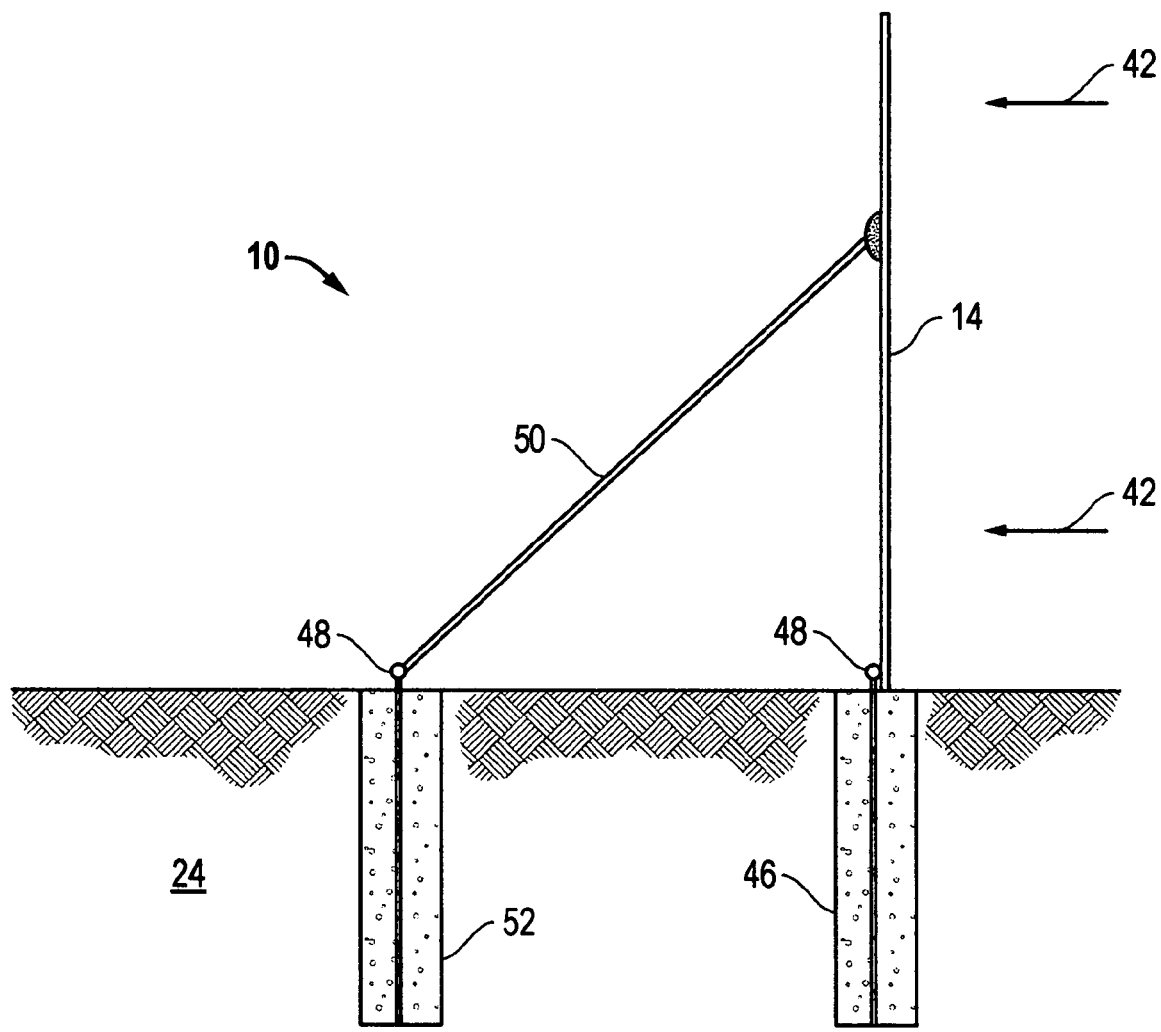
FIG. 4 is a side view of another embodiment of the invention wherein the wave disrupter is a metal plate.

Now referring to FIG. 4, the wave diffuser 10 according to this embodiment includes retention base 46. Retention base 46 is set in ground 24 and includes attachment device 48. Retention base 46 is preferably a concrete form extending into the ground 24 a distance of four feet for example only. Attachment device 48 may be an eye bolt or any other attachment now known or hereafter developed secured to retention base 46. Wave disrupter 14 is attached to retention base 46 by attachment device 48. In a preferred embodiment, attachment device 48 acts as a hinge and allows wave disrupter 14 to be raised and lowered while still attached to retention base 46.

FIG. 4 also illustrates load rod 50 attached at one end to wave disrupter 14 and at its other end to load rod retention base 52. Load rod retention base 52 is similar to retention base 46 and includes attachment device 48. According to one aspect of the invention illustrated in FIG. 4, wave diffuser 10 is permanently installed. When not in use, attachment devices 48 are used to allow wave disrupter 14 to lay flat on the ground 24. When needed, it is a simple matter to raise wave disrupter 14 and re-secure it in place. Obviously, those of ordinary skill in the art can see that the entire wave diffuser 10, according to this embodiment, can be configured to be hydraulically or mechanically raised and lowered without physical intervention. Also, there may be more than one load rod 50 attached to a wave disrupter 14.

Figure 5:
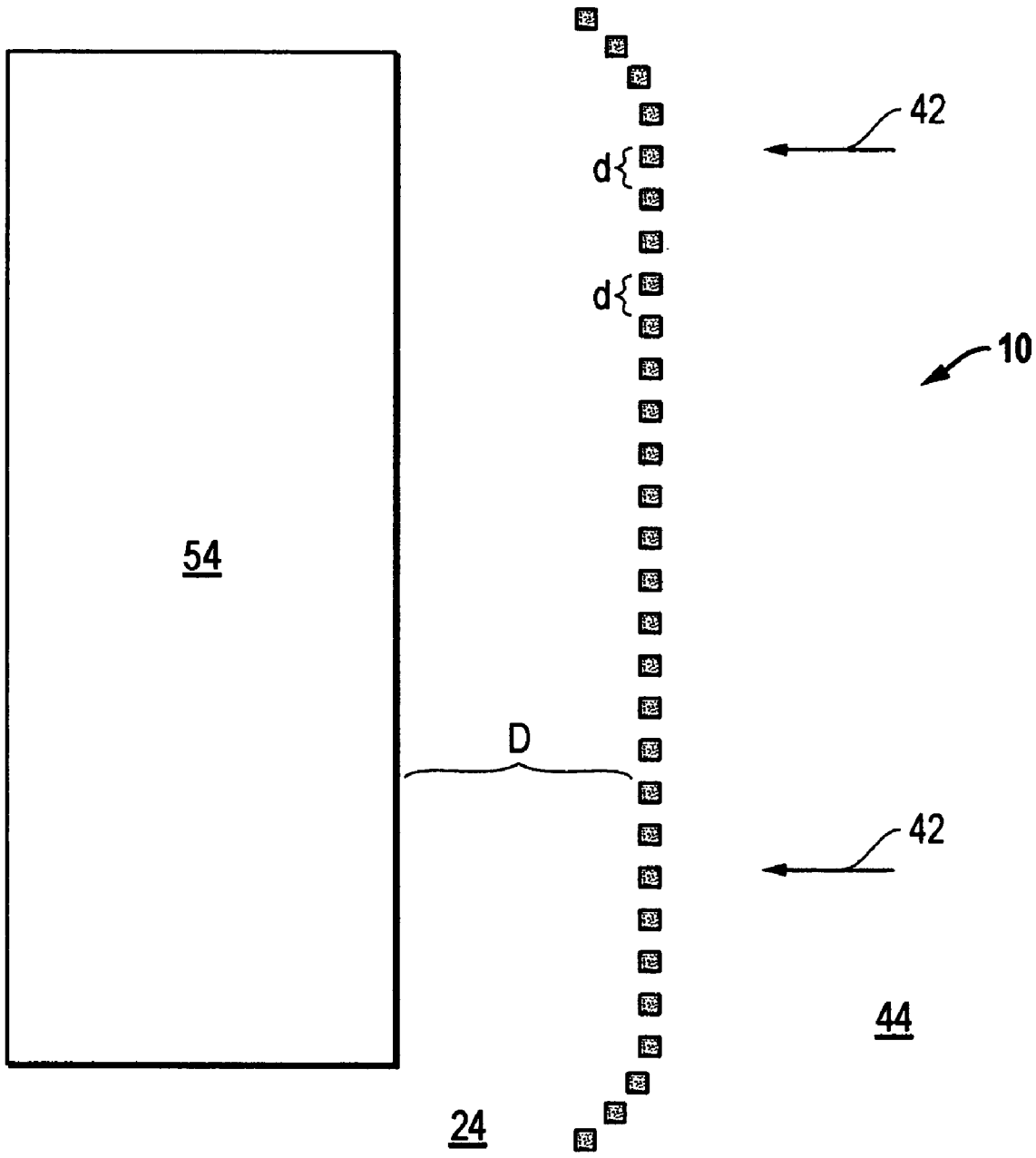
FIG. 5 is a schematic top view of a preferred embodiment of an installation layout of the wave diffuser of the present invention.

Referring now to FIG. 5, a schematic of a preferred layout of Applicant's wave diffuser 10 is shown. Here, the structure 54 is shown located on the left facing the wave source to the right coming from the direction of direction arrows 42. Wave diffusers 10 are located in spaced apart relation to structure 54 such that each wave diffuser 10 is approximately the same distance "D" from structure 54. The actual distance D can vary but must not be so close to structure 54 that wave disrupters 14 are ineffective. This "too close" distance is approximately any distance less than ten feet.

Also, obviously, the efficiency of wave diffuser 10 is greatly diminished if it is located too far from structure 54. This "too far" distance is any distance that allows the disrupted waves to reform. Any distance more than one hundred feet from a structure 54 is likely to be too far.

Applicant has determined that the preferred location of wave diffuser 10 is between ten and twenty feet from structure 54. A distance D of fifteen feet is preferred in most cases.

Additionally, FIG. 5 shows that wave diffusers 10 are installed in spaced apart relation to each other. That is, each wave diffuser is preferably spaced apart from each other wave diffuser 10 the same distance "d". While distance d may vary, Applicant has determined that a distance of between one to two feet is preferred.

FIG. 5 also illustrates that wave diffusers 10 may wrap around the ends of structure 54 slightly. This may simply be a result of the configuration of the ground 54 or a desire to add protection even to the sides of structure 54. Certainly structure 54 may be completely surrounded by wave diffusers 10.

It should be apparent by now that wave diffusers 10 may be located on land 24 or in water 44 and still function as designed.

In operation, according to one embodiment, before a storm, a user locates a plurality of receiver bases 12, and/or retention bases 46 and load rod retention bases 52, a proper distance D from the structure 54 he is protecting and a proper distance d from each other. Thereafter, the user preassembles wave disrupters 14 out of easily obtained materials as set forth above. Load collars 26 are attached and the appropriate load applicator 28, such as cable 30, anchor 32 and load adjuster 38, is gathered.

Upon learning of an approaching wave generating event, such as a hurricane for example, the user simply places wave disrupters 14 in receiver bases 12. Load applicator 28 is assembled, as for example, by screwing helical screw 34 into the ground 24 and attaching cable 30 to cable attachment point 36. Obviously, helical screw 34 may be pre-installed. Thereafter load adjuster 38 may be used to apply a tensioning load to wave disrupters 14. In the case of the embodiment shown in FIG. 4, a simple push of a button raises wave disrupters 14 from their permanently installed reclined position.

Applicant has determined that the presence of a plurality of wave diffusers 10 as set forth above, dramatically and unexpectedly reduces damage from storm driven waves by disrupting the waves prior to impact with the structure 54. Where solid retaining and/or structural walls are beaten to rubble, Applicant's spaced apart wave diffusers 10 present a small enough surface area to withstand continuous pounding and still disrupt and diffuse the waves. By means of Applicant's invention, instead of being beaten down by the full force of a cohesive wave, the structure 54 protected by Applicant's invention easily resists the swirling waters of the disrupted wave that impacts the structure 54.

While the present invention has been disclosed in connection with the preferred embodiments thereof, is should be understood that there may be other embodiments which fall within the spirit and scope of the invention as defined by the following claims.

What is claimed is:

1. A wave diffuser apparatus comprising:
    a) a receiver base wherein said receiver base includes an extended lip;
    b) a wave disrupter conformed to attach to said receiver base;
    c) a load collar attached to said wave disrupter; and
    d) a load applicator attached to said load collar.

2. The apparatus of claim 1 wherein said wave disrupter comprises a plurality of separate forms bound together and attached together to said receiver base.

3. The apparatus of claim 2 wherein said plurality of separate forms are selected from a group consisting of: four, nine and sixteen separate forms.

4. The apparatus of claim 1 wherein said load applicator is a cable.

5. The apparatus of claim 1 wherein said load applicator includes a load adjuster.

6. The apparatus of claim 1 further comprising more than one load applicator.

7. The apparatus of claim 1 wherein said load applicator includes a load applicator anchor.

8. A wave diffuser apparatus comprising:
    a) a receiver base with a top and a bottom with an extended lip attached near the bottom;
    b) a wave disrupter conformed to attach to said receiver base;
    c) a load collar attached to said wave disrupter;
    d) a load applicator attached to said load collar; and
    e) a load adjuster attached to said load applicator.

9. The apparatus of claim 8 wherein said wave disrupter comprises a plurality of separate forms bound together and attached together to said receiver base.

10. The apparatus of claim 9 wherein said plurality of separate forms are selected from a group consisting of: four, nine and sixteen separate forms.

11. The apparatus of claim 8 wherein said wave disrupter comprises an impact plate.

12. The apparatus of claim 8 further comprising a brace connected to said wave disrupter.

13. The apparatus of claim 8 wherein said load applicator is a cable.

14. The apparatus of claim 8 wherein said load applicator includes a load applicator anchor.

15. A method of protecting structures from damage from waves comprising:
    a) preparing a receiver base;
    b) installing a plurality of said receiver bases between a structure and a wave source wherein each receiver base is spaced apart from another receiver base a distance;
    c) attaching a wave disrupter to each of said receiver bases;
    c) attaching a load collar to each of said wave disrupters;
    d) attaching a load applicator to each of said load collars; and
    e) attaching a load adjuster to each of said load applicators and applying a load.

16. The method of claim 15 wherein the step of installing a plurality of receiver bases includes installing said plurality of receiver bases within the wave source.

* * * * *

UNITED STATES PATENT AND TRADEMARK OFFICE
CERTIFICATE OF CORRECTION

PATENT NO.         : 7,146,919 B1
APPLICATION NO. : 11/101839
DATED              : December 12, 2006
INVENTOR(S)        : John R. Ehrenreich It is certified that error appears in the above-identified patent and that said Letters Patent is hereby corrected as shown below:

On the Title Page, Item (73) Assignee:   CoastLine Protection, Inc., Golf Breeze, FL (US) should read
CoastLine Protection, Inc., Gulf Breeze, FL (US).

Signed and Sealed this

Twenty-ninth Day of May, 2007

JON W. DUDAS
*Director of the United States Patent and Trademark Office*